H. T. WEIRBACH.
CUTTER HEAD.
APPLICATION FILED APR. 20, 1910.
1,014,794.
Patented Jan. 16, 1912.
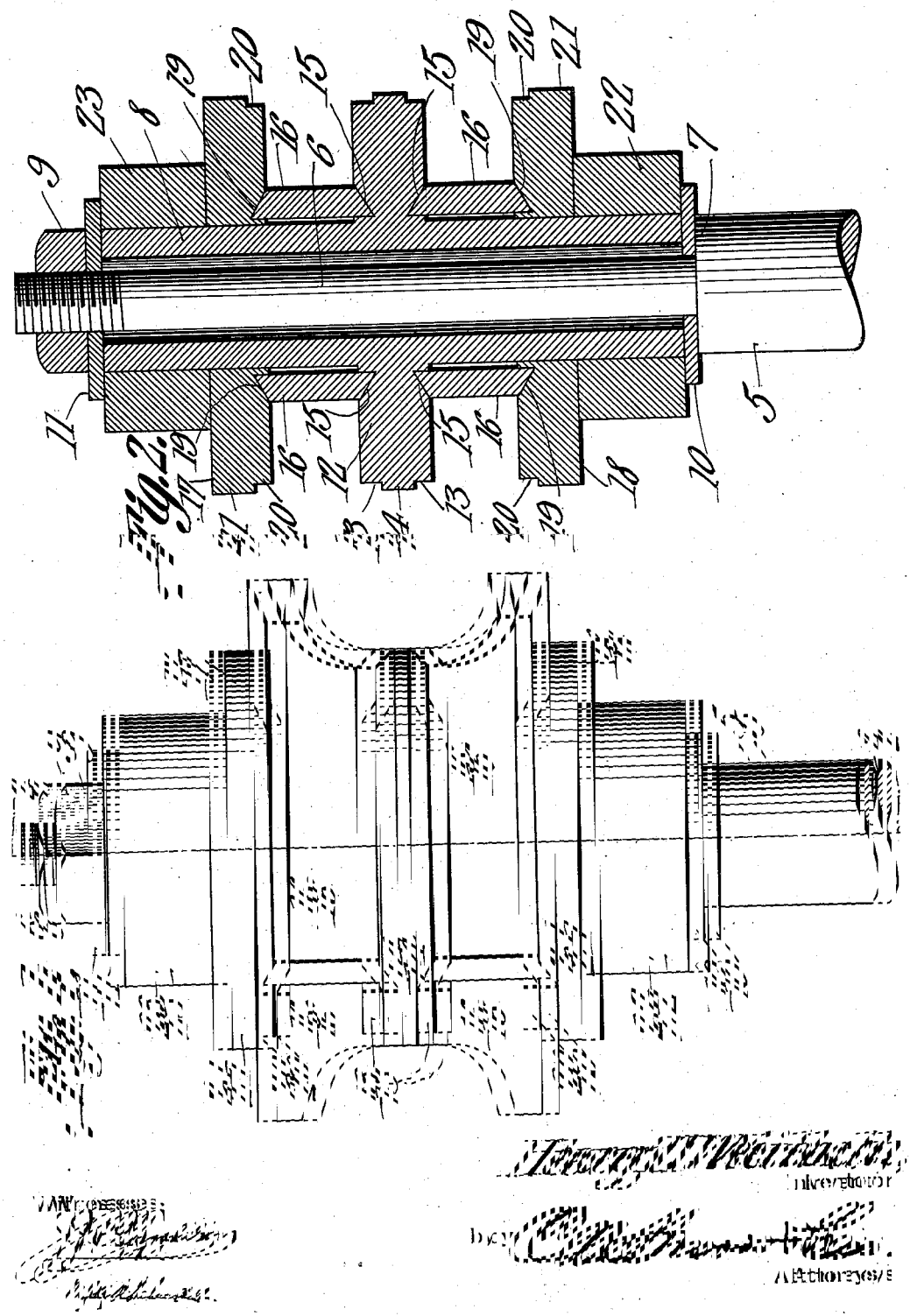

UNITED STATES PATENT OFFICE.

HENRY T. WEIRBACH, OF ALLENTOWN, PENNSYLVANIA.

CUTTER-HEAD.

1,014,794. Specification of Letters Patent. Patented Jan. 16, 1912.

Application filed April 20, 1910. Serial No. 556,511.

*To all whom it may concern:*

Be it known that I, HENRY T. WEIRBACH, a citizen of the United States, residing at Allentown, in the county of Lehigh and State of Pennsylvania, have invented a new and useful Cutter-Head, of which the following is a specification.

This invention relates to cutter heads for shapers, molders and similar wood working machines, and it has for its object to provide an improved holder for the knives, which holder will insure smooth running, and a free cut, and also to provide a holder which is adapted for knives of different sizes and different shaped cutting edges, the knives being so fastened that they can be readily removed and exchanged.

With these objects in view, the invention consists in a novel construction and arrangement of parts to be hereinafter described and claimed, and in order that it may be fully understood, reference is had to the accompanying drawing, in which drawing, Figure 1 is an elevation of the cutter head. Fig. 2 is a vertical section on the line 2—2 of Fig. 1.

In the drawing, 5 denotes the spindle on which the cutter head is mounted. The spindle has a reduced portion 6 which forms a shoulder 7. On the reduced portion of the spindle is mounted a sleeve 8 which is held in place by the shoulder 7, and by a nut 9 screwed on the upper end of said reduced portion of the spindle, a washer 10 being interposed between the lower end of the sleeve and the shoulder, and a washer 11 between the nut and the upper end of the sleeve. Upon tightening up the nut, the sleeve will be rigidly mounted on the spindle, so as to turn therewith.

Formed integral with the sleeve 8, midway between its ends, is a circular collar 12 having rabbets 13 in its periphery, forming a central reduced portion 14 at the periphery. The collar is formed on both sides with transverse grooves 15, these grooves being located on opposite sides of the sleeve 8, and entering the collar the same distance as the depth of the rabbets 13, so that the knives 16 which are mounted in these grooves may extend through the rabbets with their cutting edges extending to the periphery of the reduced portion 14 of the collar, as shown in Fig. 1.

The knives 16 are held in place by circular collars 17 and 18, respectively, located on opposite sides of the collar 12, the collar 17 being located above the collar 12, and the collar 18 below the same. One pair of knives is held between the collars 12 and 17, and another pair of knives is held between the collar 12 and the collar 18. The collars 17 and 18 also have transverse grooves 19 to receive the edges of the blades which are opposite the edges which seat in the grooves 15, both of said edges being beveled as shown in Fig. 2 and the grooves being correspondingly shaped.

At the periphery of the collars 17 and 18, on that side which is opposite the collar 12, are rabbets 20, having the same depth as the grooves 19, through which the blades extend. These rabbets form reduced portions 21 at the periphery of the collars 17 and 18. The collars 12, 17 and 18 have the same diameter in view of which the reduced peripheral portions 14 and 21 will be in alinement.

The collars 17 and 18 have central openings through which the sleeve 8 passes, and the knives 16 are clamped between said collars and the collar 12 upon tightening up the nut 9, a clamping collar 22 being interposed between the washer 10 and the collar 18, and a similar collar 23 between the washer 11 and the collar 17.

The cutters 16 are flat blades having their opposite longitudinal edges beveled to seat in the grooves 15 and 19 as already described, said cutters being securely clamped in operating position between the collars upon tightening up the nut 9. One of the ends of each cutter has a rounded cutting edge as shown in Fig. 1, and the upper and lower cutters are so arranged with respect to each other as to round the edge of the work. Cutters of different sizes and shapes may be substituted for the ones shown, the change being readily effected upon loosening the nut 9, after which the cutters can be removed. A cutter head as herein described insures smooth running, and a free cut. The rabbets in the collars give ample clearance to the knives.

What is claimed is:

The combination with a spindle having a shouldered end and provided with a threaded terminal, a washer engaging the shouldered end, and a washer mounted upon the threaded terminal, of a cutter head comprising a main sleeve adapted to surround the said spindle and abutting the two washers at its respective ends, a centrally disposed annular collar formed integral with said sleeve and provided with two parallel grooves extending across the sides thereof and upon each side of the sleeve, two collars slidably mounted upon the sleeve one upon each side of its integral collar, each of said slidable collars having grooves to correspond with the grooves of the integral collar, cutter blades mounted in the grooves of the collars, and two clamping sleeves one to each respective end of the main sleeve mounted thereon and adapted to be engaged by the respective washers and a nut to clamp the collars and cutters together.

In testimony that I claim the foregoing as my own, I have hereto affixed my signature in the presence of two witnesses.

HENRY T. WEIRBACH.

Witnesses:
R. A. B. HAUSMAN,
A. F. BERLIN.

---

Copies of this patent may be obtained for five cents each, by addressing the "Commissioner of Patents, Washington, D. C."